United States Patent
Carney et al.

(10) Patent No.: US 7,395,538 B1
(45) Date of Patent: Jul. 1, 2008

(54) SCALABLE PACKET PROCESSING SYSTEMS AND METHODS

(75) Inventors: John C. Carney, Bedford, MA (US); Michael E. Lipman, Harvard, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1090 days.

(21) Appl. No.: 10/382,863

(22) Filed: Mar. 7, 2003

(51) Int. Cl.
*G06F 9/46* (2006.01)
*G06F 15/00* (2006.01)
*G06F 7/38* (2006.01)

(52) U.S. Cl. .................... 718/105; 712/1; 712/220; 712/225

(58) Field of Classification Search .......... 712/1–300; 345/501–522; 718/1, 100–108
See application file for complete search history.

(56) References Cited

U.S. PATENT DOCUMENTS

| | | | |
|---|---|---|---|
| 5,394,524 A * | 2/1995 | DiNicola et al. | 345/506 |
| 6,016,150 A * | 1/2000 | Lengyel et al. | 345/426 |
| 6,088,044 A * | 7/2000 | Kwok et al. | 345/505 |
| 6,570,571 B1 * | 5/2003 | Morozumi | 345/505 |
| 6,847,366 B2 * | 1/2005 | Walls et al. | 345/505 |
| 6,853,380 B2 * | 2/2005 | Alcorn | 345/506 |
| 6,882,346 B1 * | 4/2005 | Lefebvre et al. | 345/506 |
| 6,885,376 B2 * | 4/2005 | Tang-Petersen et al. | 345/506 |
| 7,212,211 B2 * | 5/2007 | Ebihara et al. | 345/506 |

OTHER PUBLICATIONS

Webb, Jon A. "Architecture—Independent Global Image Processing." IEEE. 1990.*
Nishimura, Satoshi et al. "VC-1: A Scalable Graphics Computer with Virtual Local Frame Buffers." ACM. 1996.*
Messerili, Vincent et al. "Parallelizing I/O—Intensive Image Access and Processing Applications." IEEE Concurrency. 1999.*

* cited by examiner

*Primary Examiner*—Lewis A. Bullock, Jr.
*Assistant Examiner*—Jennifer N To
(74) *Attorney, Agent, or Firm*—Harrity Snyder, LLP

(57) ABSTRACT

A data processing architecture includes multiple processors connected in series between a load balancer and reorder logic. The load balancer is configured to receive data and distribute the data across the processors. Appropriate ones of the processors are configured to process the data. The reorder logic is configured to receive the data processed by the processors, reorder the data, and output the reordered data.

34 Claims, 10 Drawing Sheets

SCALABLE PACKET PROCESSING SYSTEMS AND METHODS

BACKGROUND OF THE INVENTION

1. Field of the Invention

The present invention relates generally to data processing and, more particularly, to scalable packet processing systems and methods.

2. Description of Related Art

Programmable processors can be used to create highly flexible packet processing applications. Often the performance requirements of these applications exceed the capacity of a single programmable processor. Using multiple programmable processors to achieve higher performance is challenging, however. Various problems must be solved to achieve an architecture that is both highly flexible and high performing. These problems include physical connection of multiple processors to a single stream of packets; classifying, managing, balancing, and distributing the flow of packet processing work through the available processing resources; maintaining packet ordering when packets fan out and flow through different resources; and ensuring that single processing elements or engines within processors have enough program space to run the entire processing application.

There are many types of packet processing architectures. One type of processing architecture attempts to achieve high performance by creating a pipeline of processing stages. FIG. 1 is a diagram of a pipelined packet processing architecture. The pipelined architecture includes multiple processing stages 110-1 through 110-4 (collectively referred to as processing stages 110), connected in series, that act together to perform a packet processing application. Each of stages 110 performs part of the application.

When a packet arrives at a processing stage, such as processing stage 110-2, processing stage 110-2 performs a portion of the application to generate intermediate results. Processing stage 110-2 then outputs the packet and the intermediate results to the next stage (i.e., processing stage 110-3) where processing continues. Because intermediate results are transmitted in addition to the packet, the bandwidth required into and out of processing stages 110 must be greater than the bandwidth of the packet itself.

With such an architecture, high performance can be achieved by adding additional processing stages 110. When this happens, however, the application functions must be redistributed over processing stages 110. It is important to balance the application functions performed by each of processing stages 110. If one stage is given much more work than the other stages, then that stage may become overloaded while other stages have unused capacity. In this case, the overloaded stage may become a bottleneck that limits the performance of the entire pipeline.

The distribution of application functions across a pipeline is a very difficult task. It becomes even more difficult as the number of processing stages 110 increases. Also, if the application needs to be changed to add new features, then the entire application may need to be redistributed across the pipeline. As a result, the pipeline architecture is not flexible.

Another type of processing architecture attempts to achieve high performance by connecting packet processors in parallel. FIG. 2 is a diagram of a parallel packet processing architecture. The parallel packet processing architecture includes packet processors 210-1 through 210-4 (collectively referred to as processors 210) connected between a sprayer 220 and a desprayer 230. Unlike the pipelined packet processing architecture, each of processors 210 in the parallel processing architecture includes the entire packet processing application. In other words, each of processors 210 performs the same application functions.

Sprayer 220 receives packets and load balances them across processors 210. Processors 210 receive the packets, process them, and send them to desprayer 230. Because the processing time for processing packets by processors 210 may vary, the packets may become out of order relative to the order in which they were received by sprayer 220. As a result, desprayer 230 reorders the packets to the order in which they were received by sprayer 220.

This parallel processing architecture is less scalable because the functions of sprayer 220 and desprayer 230 become increasingly harder to build as the number of processors 210 increases. Also, a lot of physical connections are required to connect sprayer 220 and desprayer 230 to processors 210, making it difficult to design and build. As a result, the parallel architecture has limited performance.

Accordingly, there is a need for a scalable packet processing architecture that can flexibly connect multiple processors while supporting a dynamic set of applications and features.

SUMMARY OF THE INVENTION

Systems and methods consistent with the principles of the invention address this and other needs by providing a scalable packet processing architecture that combines the benefits of both the pipelined and parallel architectures without their shortcomings.

One aspect consistent with the principles of the invention includes a data processing architecture that includes multiple processors connected in series between a load balancer and reorder logic. The load balancer is configured to receive data and distribute the data across the processors. Appropriate ones of the processors are configured to process the data. The reorder logic is configured to receive the data processed by the processors, reorder the data, and output the reordered data.

According to another aspect consistent with the principles of the invention, a parallel pipeline system is provided. The system includes multiple pipelines connected between a load balancer and reorder logic. Each of the pipelines includes multiple processors connected in series that are configured to process data. The load balancer is configured to receive data and distribute the data across the pipelines for processing. The reorder logic is configured to receive the data processed by the processors in the pipelines, reorder the data, and output the reordered data.

According to yet another aspect consistent with the principles of the invention, a processor of multiple processors connected in one or more pipelines is provided. The processor includes multiple resources arranged in resource groups and connected between a receiver and a transmitter. The receiver is configured to receive data, determine whether the data is intended for one of the resource groups, forward the data to another one of the processors via a bypass path to the transmitter when the data is not intended for one of the resource groups, and distribute the data to one of the resources in one of the resource groups when the data is intended for one of the resource groups.

According to a further aspect consistent with the principles of the invention, a load balancer connects to multiple processors arranged in one or more pipelines. The load balancer includes a classifier, multiple queues, and binding logic. The classifier is configured to receive data. The queues are configured to store the data based on a type of the data. The binding logic is configured to identify ones of the processors to process the data stored in the queues based on states of the processors and distribute the data to the identified processors.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention provide a scalable packet processing system which is flexible in the addition of or changes to the number of processors, the application functions performed, and the features provided. The systems and methods accomplish this, at least in part, via a processing architecture that appears like a pipelined architecture, but performs like a parallel architecture.

While the description to follow will focus on the processing of packets, systems and methods consistent with the principles of the invention are not so limited. In fact, systems and methods consistent with the principles of the invention may operate upon any form of data, including packet and non-packet data.

Exemplary Single Pipeline System Overview

Figure 1:
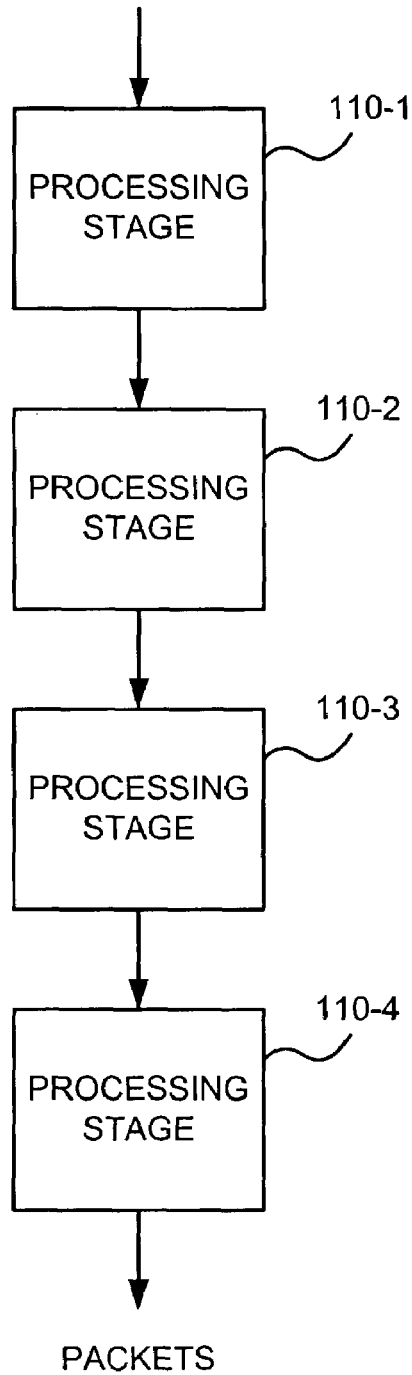
FIG. 1 is a block diagram of a pipelined packet processing architecture.
Figure 2:
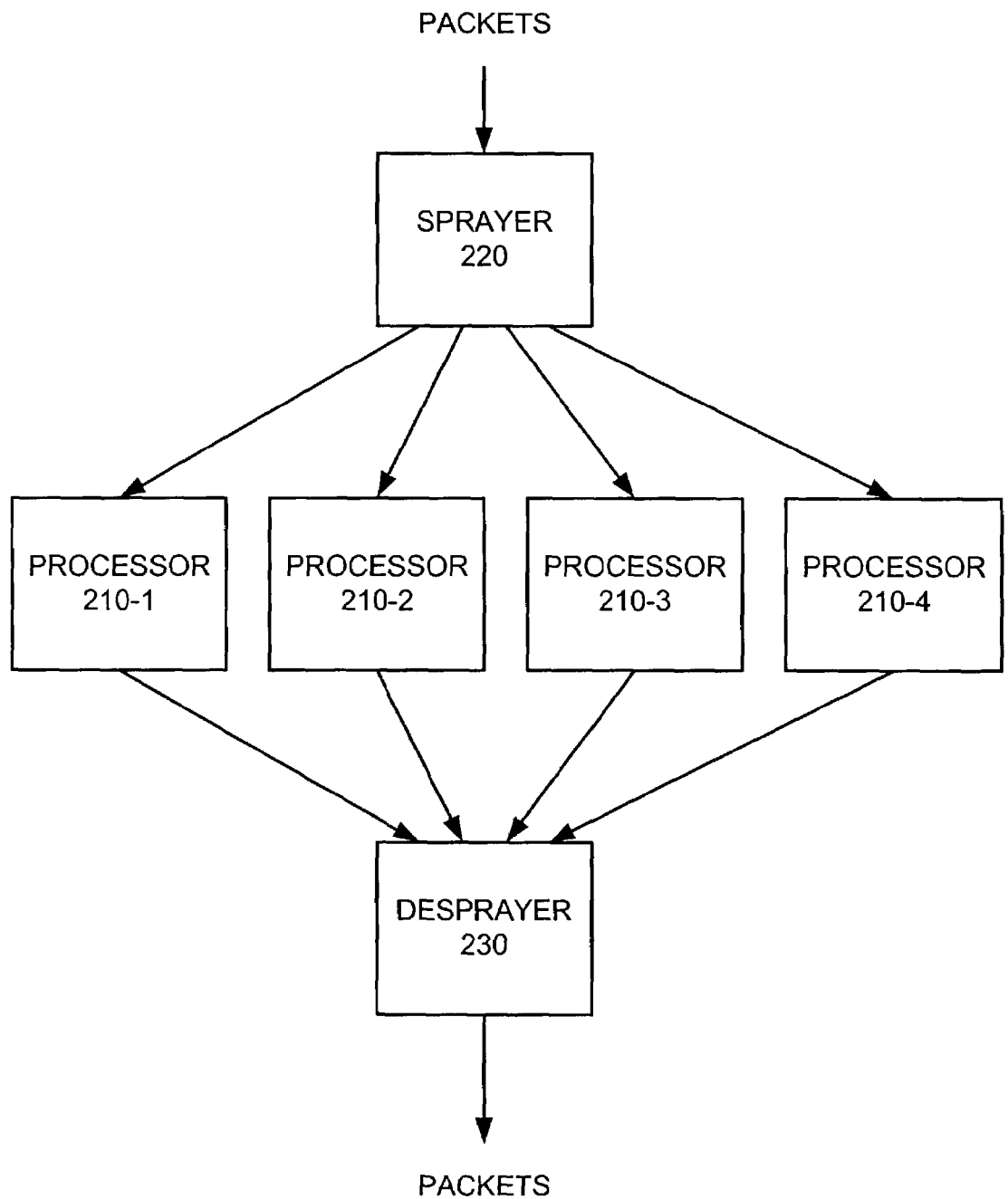
FIG. 2 is a block diagram of a parallel packet processing architecture.
Figure 3:
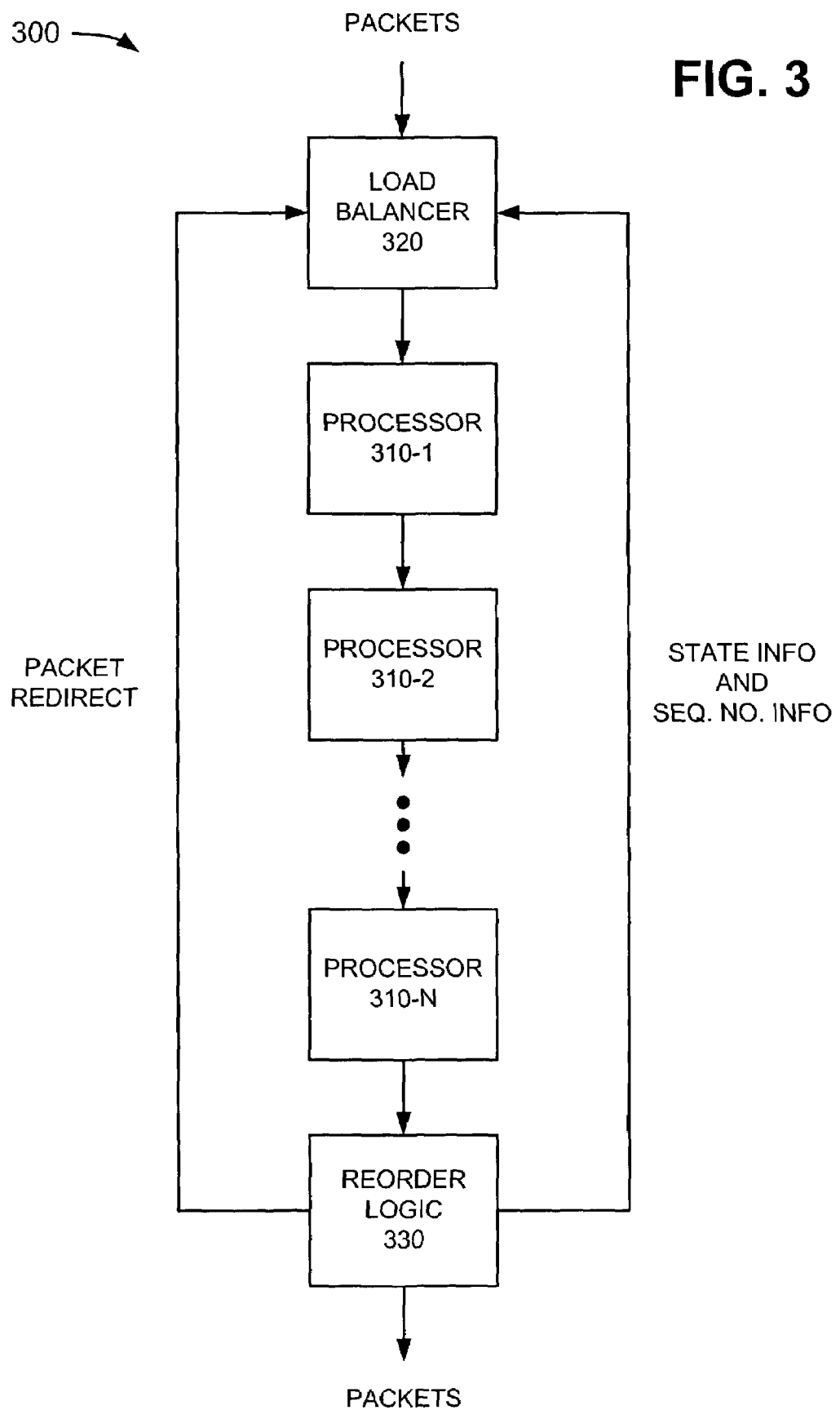
FIG. 3 is an exemplary diagram of scalable packet processing system according to an implementation consistent with the principles of the invention.

FIG. 3 is a block diagram illustrating an exemplary packet processing system 300 consistent with the principles of the invention. In one implementation, system 300 is provided within a network device, such as a router, switch, or server. System 300 may include processors 310-1 through 310-N, where N≧2 (collectively referred to as processors 310), connected as a pipeline (in series) between load balancer 320 and reorder logic 330.

The role of load balancer 320 is to coarsely manage packet processing resources of processors 310 by directing individual packets to a resource group within one of processors 310. Each of processors 310 more finely manages its own local resource groups and further directs packets to individual processing resources within that processor. This hierarchical management of processing resources means that load balancer 320 need not have knowledge of all of the individual processing resources, but only knows about groups of resources which share a common function. In many cases, this common function might be an entire packet forwarding application.

Processors 310 may include processor chips on a circuit board or processor elements of an application specific integrated circuit. Each of processors 310 may comprise one or more processing elements. Processors 310 may have a bus bandwidth capable of carrying packets at a high rate. Individual processors 310 may, however, not actually be capable of any significant packet processing of the packets at that rate. Processors 310 may connect in a physical pipeline, though, as will be described below, they act as if they were connected in parallel.

Load balancer 320 may load balance packets across all processors 310. In implementations consistent with the principles of the invention, processors 310 may include a bypass mechanism, such that if a packet arrives at a processor that is not intended for a resource local to that processor, it is transmitted out of the processor, utilizing little or no resource within that processor. This provides for physical simplicity without constraining flexibility. Instead of distributing the application across multiple processors as in the pipelined approach, each of processors 310 may run the entire application. The packets will be balanced across processors 310.

Because packets may require variable packet processing times, packets may pass each other as they move through processors 310. This means that packets may complete processing in a different order than they arrived. In many instances, it is important for packets to be sent out in the same order in which they were received. Reorder logic 330, in conjunction with load balancer 320, can order the packets back to the original order in which they were received. In one implementation, load balancer 320 tags each packet with a sequence number that can later be used by reorder logic 330 to reorder the packets. Reorder logic 330 may return sequence numbers for subsequent use by load balancer 320.

Reorder logic 330 may aid load balancer 320 in balancing the distribution of packets across processors 310. For example, reorder logic 330 may obtain information regarding the state of processors 310 and provide this information to load balancer 320.

Sometimes packets may require processing by more than one of processors 310. Reorder logic 330 may identify these packets based on information associated with the packets and send the packets back to load balancer 320 for transmission to other processors 310.

Exemplary Processor Configuration

Figure 4:
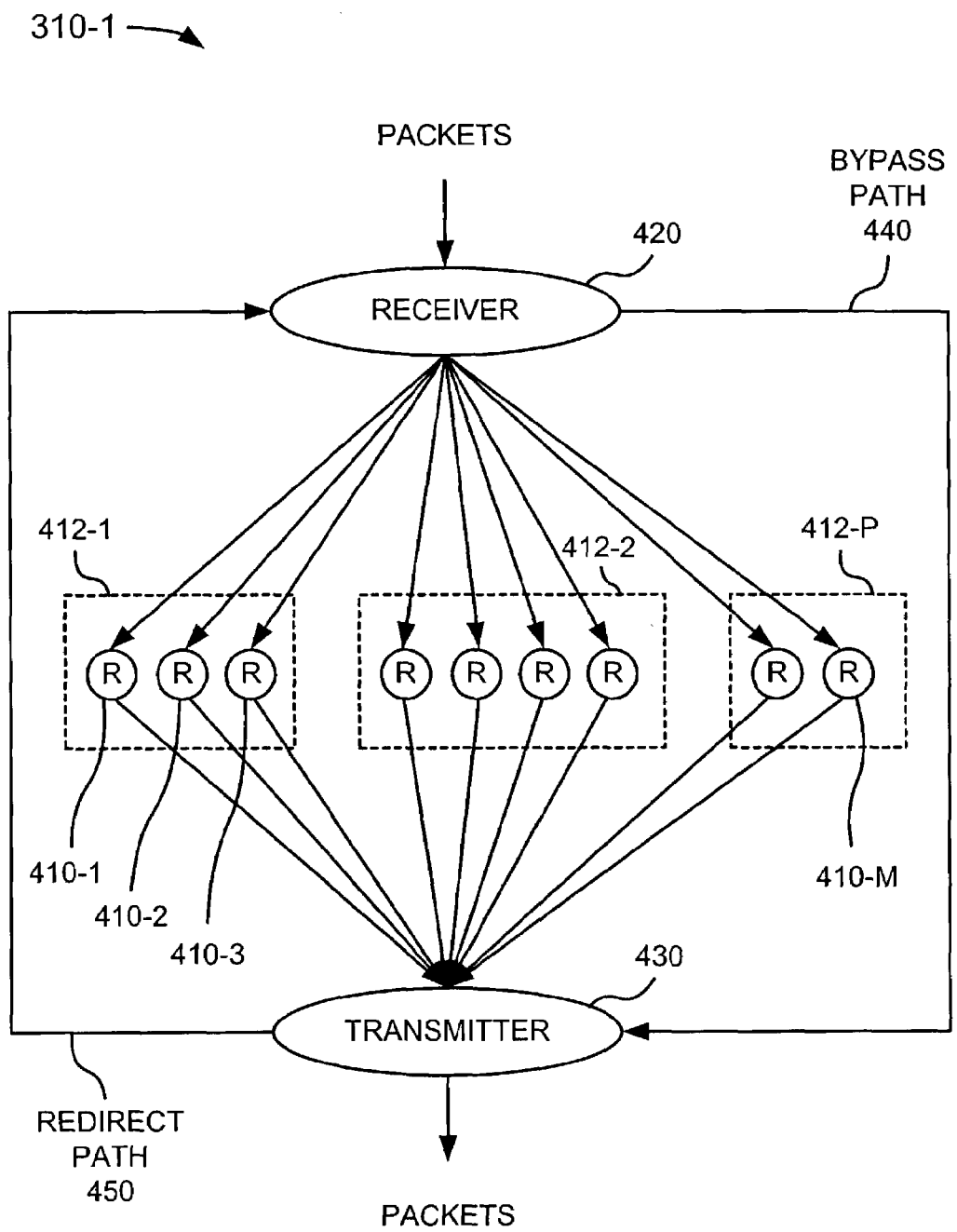
FIG. 4 is an exemplary diagram of a processor of FIG. 3 according to an implementation consistent with the principles of the invention.

FIG. 4 is an exemplary diagram of one of processors 310, such as processor 310-1, according to an implementation consistent with the principles of the invention. The other processors 310 may be configured similarly. Processor 310-1 may include a number of resources 410-1 through 410-M, where M≧1 (collectively referred to as resources 410), connected between receiver 420 and transmitter 430. Receiver 420 and transmitter 430 may further connect to each other via bypass path 440 and redirect path 450.

Resources 410 may include processing engines that perform certain packet processing functions. Each of resources 410 may include a physical resource or a virtual resource, or both. Ideally, each of resources 410 performs the entire set of processing functions. In practice, however, processor size may limit the size of the program that can be run on any given one of resources 410. In this case, each of resources 410 may perform a certain set of processing functions.

Resources 410 may be grouped into resource groups 412-1 through 412-P, where P≧1 (collectively referred to as resource groups 412), based on the particular processing functions they perform. All resources 410 within one of resource groups 412 may perform the same processing functions. For example, resources 410 within one of resource groups 412 may perform Ethernet-related functions, while resources 410 within another one of resource groups 412 may perform ATM-related functions.

Receiver 420 may include logic that determines whether a received packet should be sent to a local resource (e.g., one of resources 410) or bypassed. Based on information included with or within the packet (e.g., a processor identifier and/or a resource group identifier), receiver 420 may identify one of resource groups 412 to process the packet. In this case, receiver 420 may assign the packet to one of resources 410 within the identified one of resource groups 412 in a manner to balance the number of packets (or amount of work or load) given to any one of resources 410. Receiver 420 may maintain information regarding the current load of its resources 410 so that it can balance the number of packets given to any one of resources 410 in an intelligent manner.

Alternatively, receiver 420 may determine that a packet is a "bypass packet" that is not intended for any of its resources 410. It may be important that the amount of effort required for receiver 420 to identify a bypass packet be minimal. When receiver 420 identifies a bypass packet, receiver 420 transmits the packet to transmitter 430 via bypass path 440. Processor 310-1 may be able to pass packets (via its bypass path 440) at full line rate.

Transmitter 430 may include logic that transmits packets from processor 310-1 to processor 310-2. Transmitter 430 of processor 310-N may transmit packets to reorder logic 330. Transmitter 430 may also redirect packets back to receiver 420 via redirect path 450. For example, a packet may require execution by more than one resource 410 within processor 310-1. In this case, transmitter 430 may redirect the packet to receiver 420 instead of sending the packet out of processor 310-1. Transmitter 430 may identify these packets based on information provided by resources 410. Receiver 420 may then send the packet to another one of resource groups 412 within processor 310-1.

A packet may also require execution by a resource 410 of another one of processors 310. In this case, resource 410 may mark the packet in some manner to indicate that it should be returned to load balancer 320 for transmission to another one of processors 410.

Exemplary Load Balancer Configuration

Figure 5:
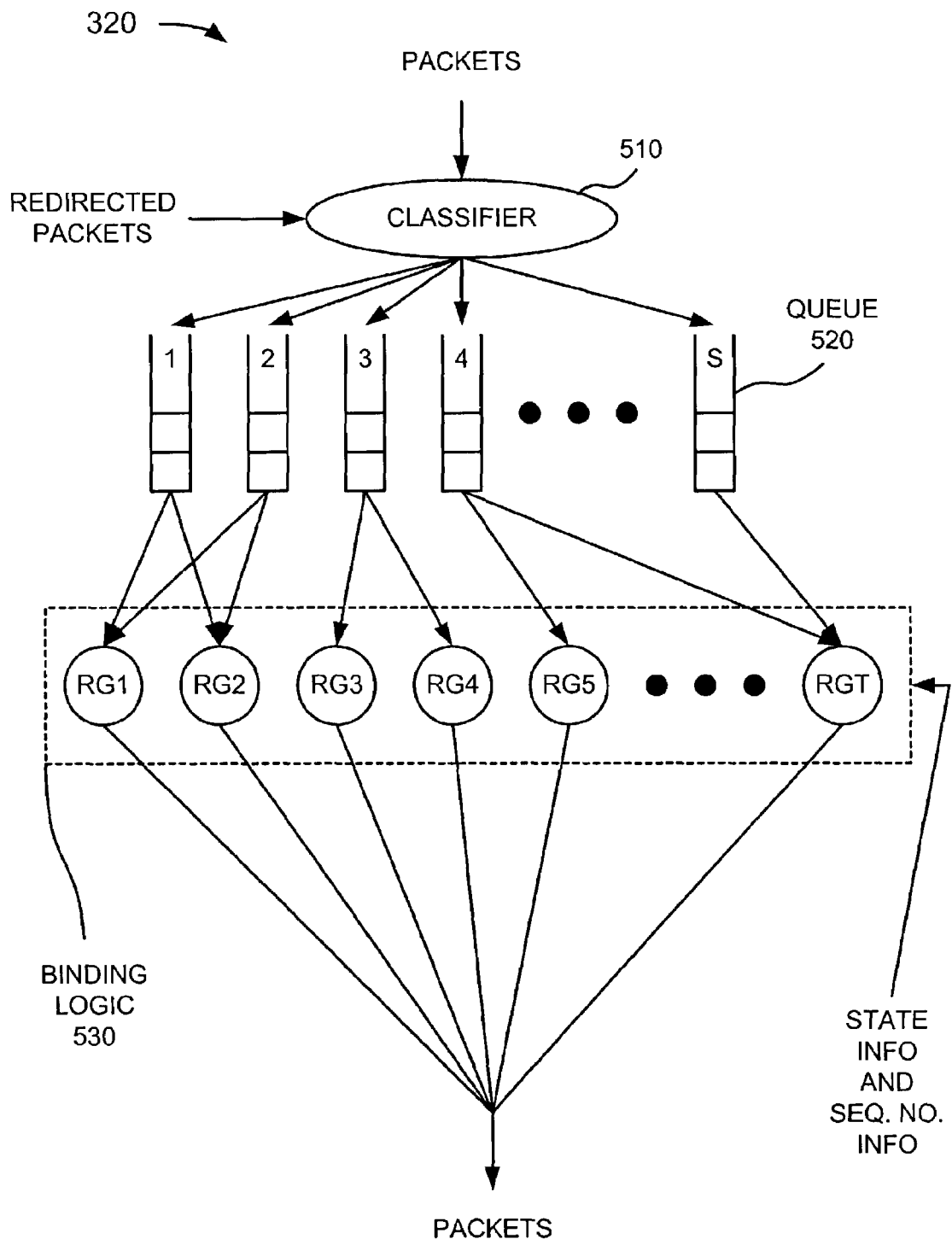
FIG. 5 is an exemplary diagram of the load balancer of FIG. 3 according to an implementation consistent with the principles of the invention.

FIG. 5 is an exemplary diagram of load balancer 320 according to an implementation consistent with the principles of the invention. Load balancer 320 may include a classifier 510, processing queues 520-1 through 520-S, where S≧1 (collectively referred to as queues 520), and binding logic 530.

Classifier 510 may include logic that processes received packets to identify which of processing queues 520 to place the packets. Classifier 510 may make this identification based on one or more fields in the packets, information associated with the packets, or both. In other implementations, classifier 510 may use other information in identifying queues 520 to receive the packets. If classifier 510 determines that a packet is dependent (i.e., the packet requires processing by more than one resource group 412 (FIG. 4), as opposed to an independent packet that requires processing by only one resource group 412), then classifier 510 may optionally place the packet in one of queues 520 dedicated to dependent packets.

Processing queues 520 may include buffers associated with different types of packets to be processed. In implementations consistent with the principles of the invention, queues 520 may not directly relate to processors 310, but instead to the types of packets that processors 310 may process. For example, queues 520 may include buffers for multicast packets, dependent packets, Ethernet packets, and ATM packets.

Binding logic 530 may include logic that associates the packets in queues 520 with resource groups 412 (labeled as resource groups RG1-RGT) of processors 310. Binding logic 530 may include bindings from queues 520 to resource groups RG1-RGT that identify resource groups 412 that are capable of processing the packets. For example, a binding may exist between queue 520-1 and resource groups RG1 and RG2. This means that packets in queue 520-1 may be sent to either resource group RG1 or resource group RG2. The resource groups' may physically reside within one or more processors 310.

Binding logic 530 may balance the distribution of packets across the associated resource groups. A particular packet may be assigned to more than one resource group (e.g., a packet from queue 520-3 may be assigned to resource group RG3 or RG4). In this case, binding logic 530 may use state information in making its assignment. Binding logic 530 may receive the state information from reorder logic 330 (FIG. 3). The state information may identify the general state of resource groups 412.

Binding logic 530 may send certain information along with packets that it outputs to processors 310. The information may be appended to the packets or sent in parallel with the packets. The information associated with a packet may include a processor identifier that identifies one of processors 310 to operate upon the packet. The information may also include a resource group identifier that identifies the particular resource group 412 to process the packet. The information may further include a sequence number that is used by reorder logic 330 to reorder packets that it receives to the order in which the packets were received by load balancer 320.

Exemplary Reorder Logic Configuration

Figure 6:
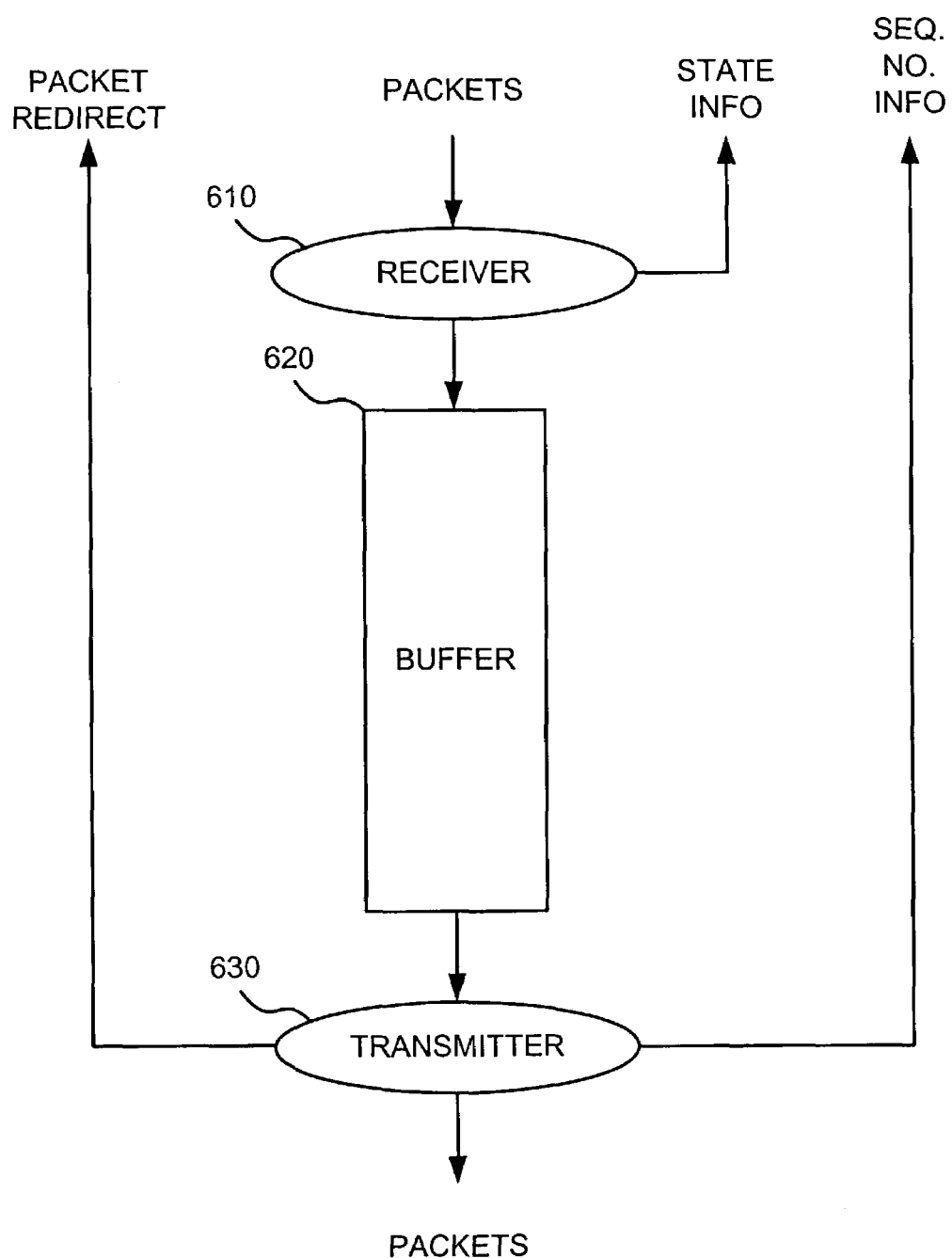
FIG. 6 is an exemplary diagram of the reorder logic of FIG. 3 according to an implementation consistent with the principles of the invention.

FIG. 6 is an exemplary diagram of reorder logic 330 according to an implementation consistent with the principles of the invention. Reorder logic 330 may include receiver 610, buffer 620, and transmitter 630. Receiver 610 may include logic to process packets received from processor 310-N and store them in buffer 620. Receiver 610 may also return state information to load balancer 320 for packets it receives. The state information may indicate that the resource group that processed the packet is available to process another packet. As described above, load balancer 320 may use the state information when balancing the number of packets sent to each of resource groups 412.

Buffer 620 may store the packets based on their associated sequence numbers. Load balancer 320 may assign sequence numbers to packets that accompany the packets during processing by processors 310.

Figure 7:
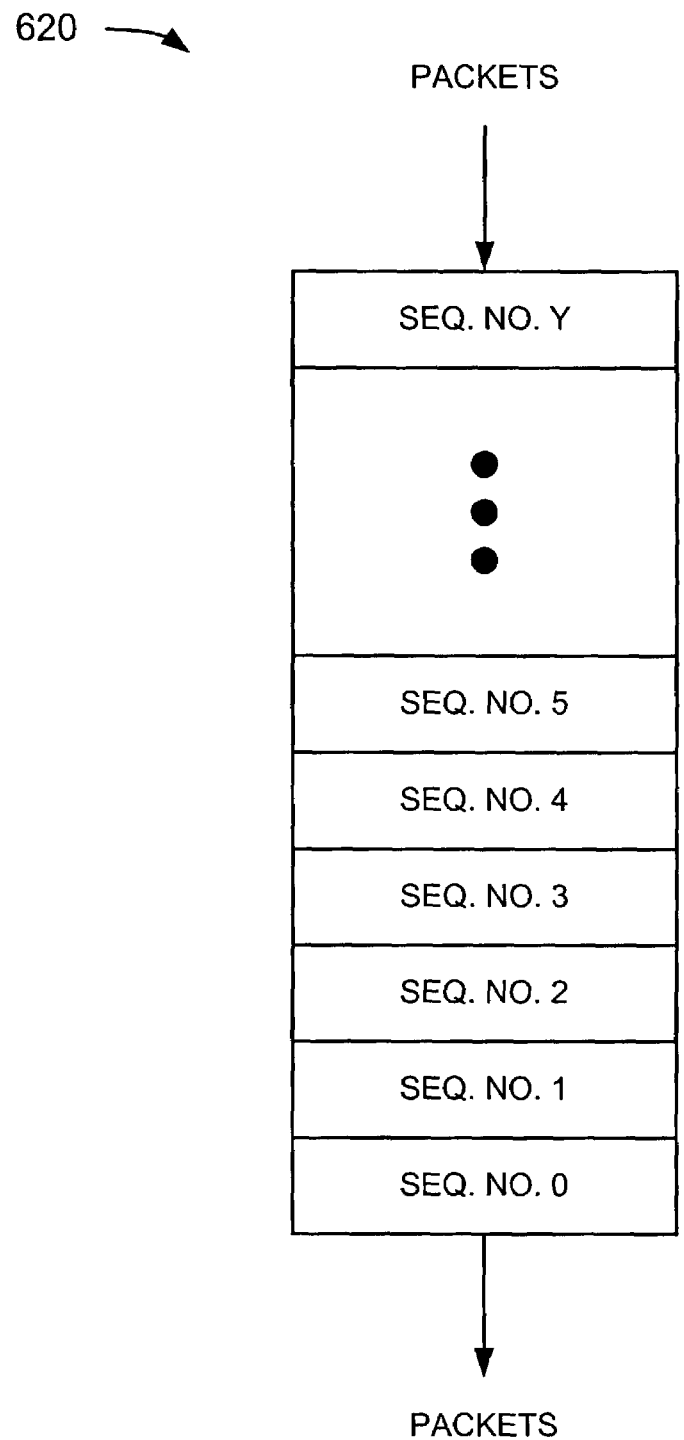
FIG. 7 is an exemplary diagram of the buffer of FIG. 6 according to an implementation consistent with the principles of the invention.

FIG. 7 is an exemplary diagram of buffer 620 according to an implementation consistent with the principles of the invention. Buffer 620 may include multiple storage locations that are addressable using the sequence number. When receiver 610 writes a packet to buffer 620, receiver 610 writes the packet to the storage location corresponding to the packet's sequence number. For example, when receiver 610 receives the packet associated with sequence number 2, receiver 610 writes the packet to buffer 620 at the storage location associated with sequence number 2.

Returning to FIG. 6, transmitter 630 may include logic that reads packets from buffer 620. Transmitter 630 may read the packets in order based on their sequence numbers. Transmitter 630 may wait for packets with earlier sequence numbers before reading packets with later sequence numbers. For throughput purposes, transmitter 630 may wait a predetermined amount of time for arrival of the packets with earlier sequence numbers. If this time period expires, transmitter 630 may begin reading the packets with the later sequence numbers and drop any of the packets with the earlier sequence numbers if they subsequently arrive.

When transmitter 630 reads a packet from buffer 620, transmitter 630 may determine whether the packet is to be transmitted from system 300 or sent back to load balancer 320 for further processing. Transmitter 630 may use information included with the packet in determining whether the packet requires further processing by system 300. For example, when a packet is processed by a processor 310, processor 310 may determine that the packet requires additional processing by another processor (or resource group). In this case, processor 310 may include instructions with the packet that instruct reorder logic 330 to send the packet to load balancer 320 for further processing. Transmitter 630 may use this information to redirect a packet back to load balancer 320.

When transmitter 630 reads a packet from buffer 620, transmitter 630 may return the sequence number associated with the packet to load balancer 320. Load balancer 320 may reuse the sequence number at the appropriate time.

Exemplary Processing for Single Pipeline System

Figure 8:
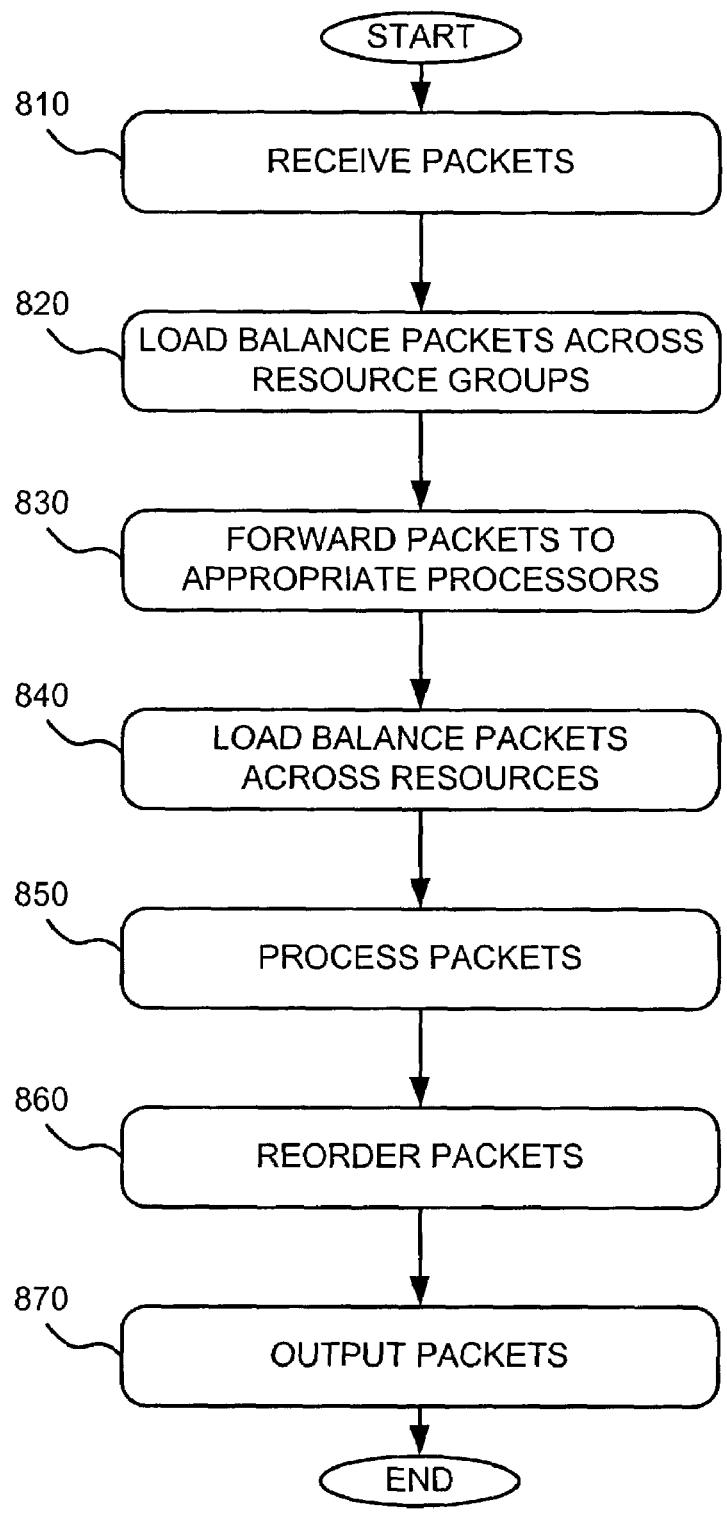
FIG. 8 is a flowchart of exemplary processing by the packet processing system of FIG. 3 according to an implementation consistent with the principles of the invention.

FIG. 8 is a flowchart of exemplary processing by packet processing system 300 according to an implementation consistent with the principles of the invention. Processing may begin with load balancer 320 receiving one or more packets (act 810). Load balancer 320 may analyze the packets to load balance them across resource groups 412 within processors 310 (act 820). For example, load balancer 320 may use information within the packets (e.g., various packet fields) and information regarding the state of resource groups 412 (e.g., state information) to identify the particular resource groups 412 to which to send the packets.

Load balancer 320 may associate certain information with the packets to aid in later processing of the packets. For example, load balancer 320 may assign processor identifier and/or resource group identifier information to a packet to aid in transmission of the packet to the correct one of resource groups 412. Load balancer 320 may also assign sequence numbers to packets to help reorder logic 330 reorder the packets prior to transmission.

Load balancer 320 may then send the packets to the appropriate processors 310 (act 830). Because processors 310 are arranged in a pipeline manner, load balancer 320 may send the packets to processor 310-1 regardless of whether the packets are intended for processor 310-1. Receiver 420 (FIG. 4) of processor 310-1 may receive the packets and determine whether the packets are intended for processor 310-1. To make this determination, receiver 420 may, for example, analyze the processor identifier and/or resource group identifier information associated with the packets. Receiver 420 may forward packets that are not intended for processor 310-1 to transmitter 430 via bypass path 440. Transmitter 430 may then output the packets to processor 310-2.

For packets intended for processor 310-1, receiver 420 may load balance the packets across resources 410 of the intended resource groups 412 (act 840). For example, receiver 420 may maintain information regarding the state of the individual resources 410 and assign packets to resources 410 based on this information.

Resources 410 may then process the packets (act 850). For independent packets (i.e., packets that require processing by only one resource 410), resources 410 may process the packets to completion. For dependent packets (i.e., packets that require processing by more than one resource 410), resources 410 may process the packets and then mark them with instructions for further processing by one or more additional resources 410 either within the same processor or a different processor.

When resources 410 complete processing, they forward the packets to transmitter 430 within the respective one of processors 310. Transmitter 430 may then output the packets to either the next one of processors 310 or reorder logic 330. Processed packets may pass through other processors 310 (via their bypass paths 440) to reorder logic 330.

Reorder logic 330 may reorder the packets to the order in which the packets were received by load balancer 320 (act 860). In particular, receiver 610 (FIG. 6), within reorder logic 330, may store the packets based on their assigned sequence numbers in buffer 620. Receiver 610 may also return state information to load balancer 320. For each received packet, receiver 610 may indicate that the corresponding resource group 412 and/or processor 310 (i.e., the one that processed the packet) is/are available for additional packet processing. As described above, load balancer 320 may use the state information in balancing the load given to resource groups 412 and/or processors 310.

Transmitter 630 may read the packets from buffer 620 based on their sequence numbers. Transmitter 630 may return the sequence numbers to load balancer 320 for reuse at the appropriate time. Transmitter 630 may also determine whether a packet is a dependent packet that requires processing by another one of resource groups 412. Transmitter 630 may make this determination based on instructions provided by the resource that processed the packet. These instructions may accompany the packets. When the packet is dependent, transmitter 630 may send the packet to load balancer 320 for distribution to the appropriate one of resource groups 412.

For packets that have completed processing, transmitter 630 may output them from system 300 in the order in which they were received by load balancer 320 (act 870).

Exemplary Multiple Pipeline System Overview

Figure 9:
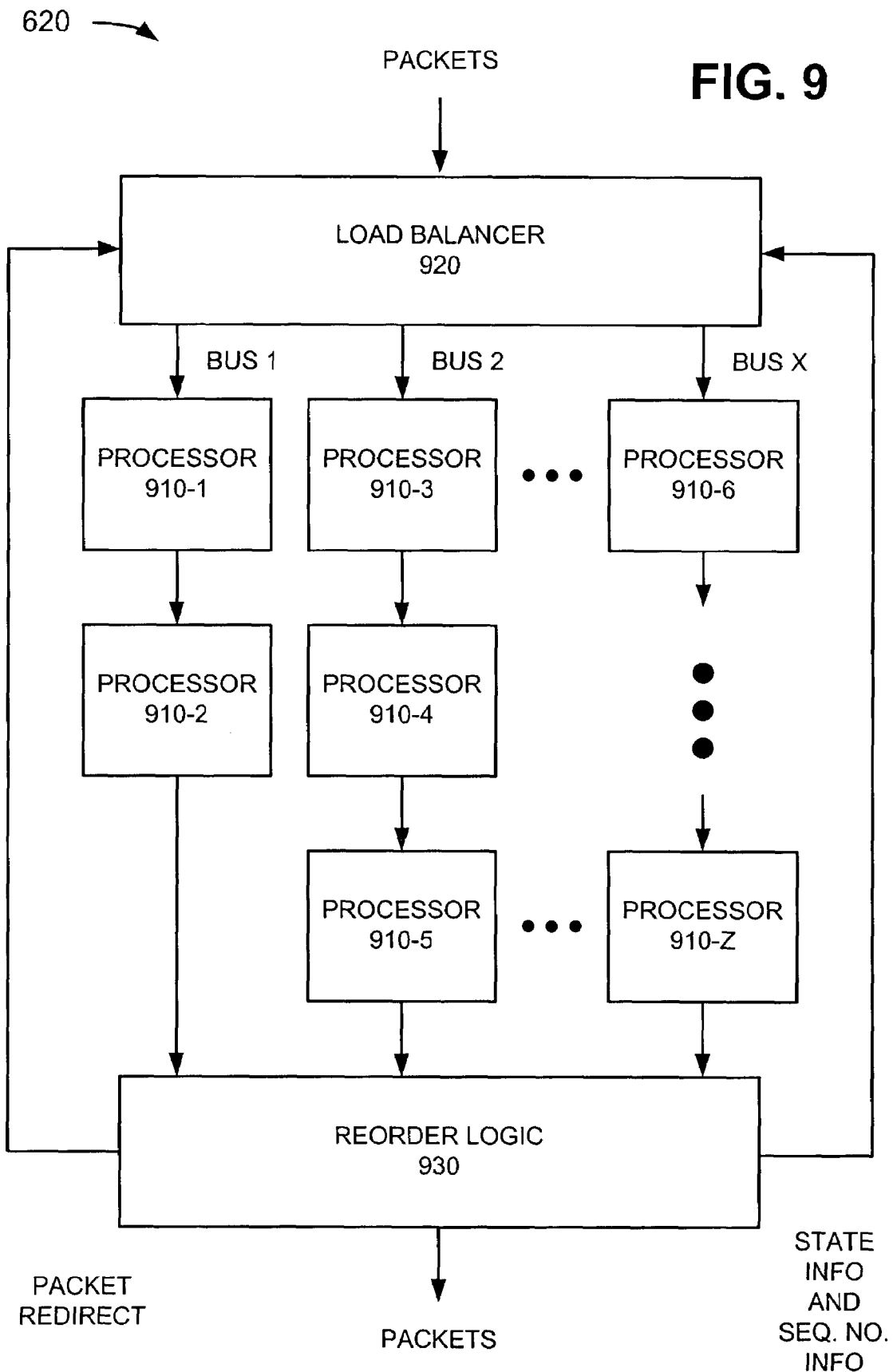
FIG. 9 is a block diagram illustrating an exemplary multiple pipeline packet processing system consistent with the principles of the invention.

FIG. 9 is a block diagram illustrating an exemplary multiple pipeline packet processing system 900 consistent with the principles of the invention. System 900 may include processors 910-1 through 910-Z, where $Z \geq 4$ (collectively referred to as processors 910), connected in parallel pipelines (via buses 1-X) between load balancer 920 and reorder logic 930. Processors 910 and reorder logic 930 may be configured and operate similar to processors 310 and reorder logic 330, respectively, as described above with regard to FIGS. 3-8.

Figure 10:
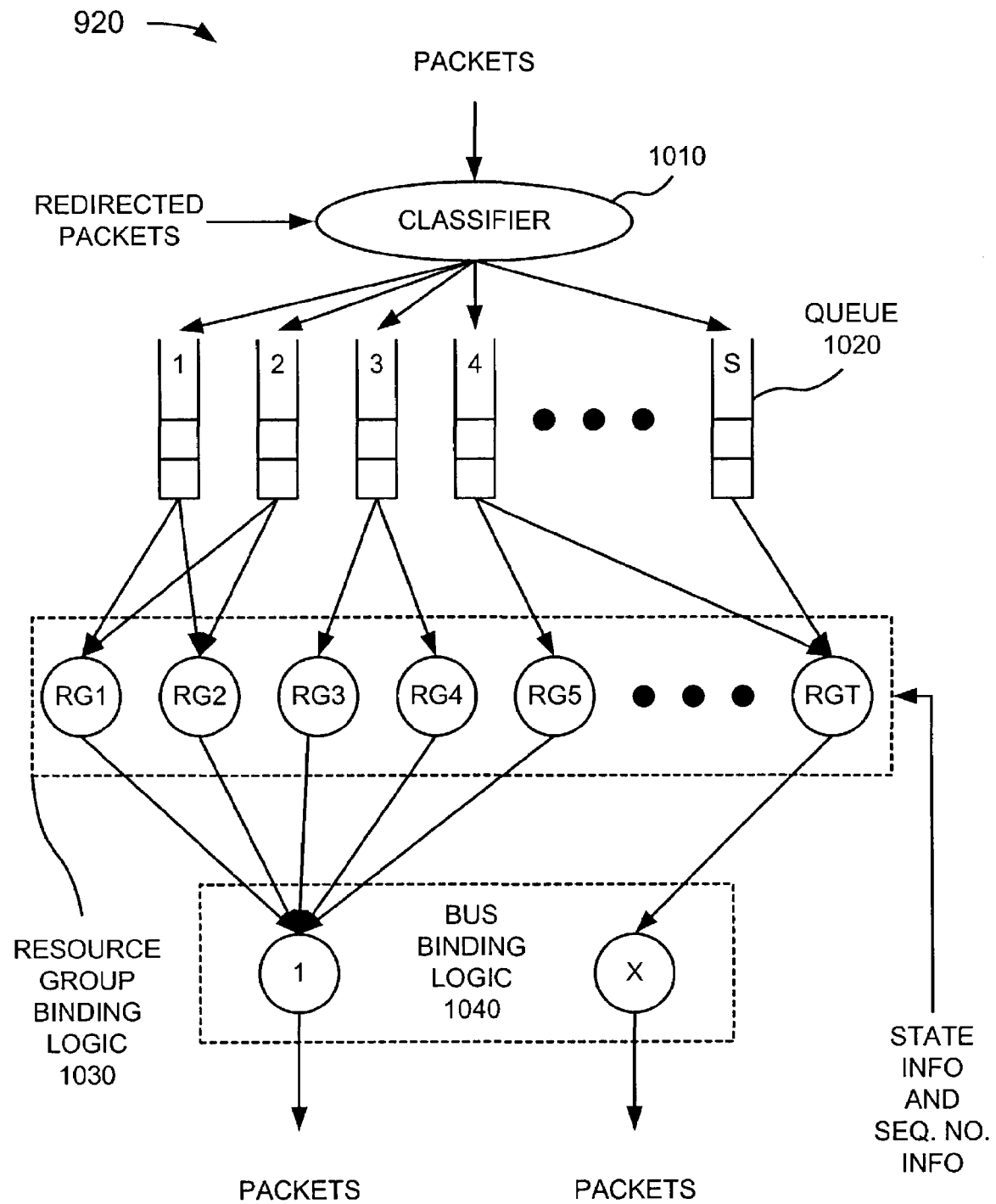
FIG. 10 is an exemplary diagram of the load balancer of FIG. 9 according to an implementation consistent with the principles of the invention.

Load balancer 920 may be configured different from load balancer 320 to account for the multiple parallel processor pipelines. FIG. 10 is an exemplary diagram of load balancer 920 according to an implementation consistent with the principles of the invention. Load balancer 920 may include a classifier 1010, processing queues 1020-1 through 1020-S, where $S \geq 2$ (collectively referred to as queues 1020), resource group binding logic 1030, and bus binding logic 1040.

Classifier 1010 may include logic that processes received packets to identify which of processing queues 1020 to place the packets. Classifier 1010 may make this identification based on one or more fields in the packets. In other implementations, classifier 1010 may use other information in identifying queues 1020 to receive the packets. If classifier 1010 determines that a packet is dependent, then classifier 1010 may optionally place the packet in one of queues 1020 dedicated to dependent packets.

Processing queues 1020 may include buffers associated with different types of packets to be processed. In implementations consistent with the principles of the invention, queues 1020 may not directly relate to processors 910, but instead to the types of packets that processors 910 may process. For example, queues 1020 may include buffers for multicast packets, dependent packets, Ethernet packets, and ATM packets.

Resource binding logic 1030 may include logic that associates the packets in queues 1020 with resource groups 412 (FIG. 4) (labeled as resource groups RG1-RGT) of processors 910. Binding logic 1030 may include bindings from queues 1020 to resource groups RG1-RGT that identify resource groups 412 that are capable of processing the packets. For example, a binding may exist between queue 1020-1 and resource groups RG1 and RG2. This means that packets in queue 1020-1 may be sent to either resource group RG1 or resource group RG2. As described above, the resource groups may physically reside within one or more processors 910.

Binding logic 1030 may balance the distribution of packets across the associated resource groups. When a particular packet may be assigned to more than one resource group (e.g., a packet from queue 1020-3 may be assigned to resource group 3 or 4), binding logic 1030 may use state information in making its assignment. Binding logic 1030 may receive the state information from reorder logic 930.

Binding logic 1030 may send certain information along with packets that it outputs to processors 910. The information may be appended to the packets or sent in parallel with the packets. The information associated with a packet may include a processor identifier that identifies one of processors 910 to operate upon the packet. The information may also include a resource group identifier that identifies the particular resource group 412 to process the packet. The information may further include a sequence number that is used by reorder logic 930 to reorder packets that it receives to the order in which the packets were received by load balancer 920.

Bus binding logic 1040 may include logic that associates the resource groups 412 with the pipeline buses. Binding logic 1040 may include bindings from resource groups (RG1-RGT) to buses 1-X that include resource groups 412 that are capable of processing the packets. For example, binding logic 1030 and 1040 may ultimately provide a binding between queues 1020 and the pipeline buses.

With such a configuration, binding logic 1030 and 1040 may balance distribution of packets across the resource groups (RG1-RGT) and, thus, across buses 1-X. For example, binding logic 1030 and 1040 may balance distribution of packets from queue 4 to resource groups RG5 and RGT, thereby also balancing distribution of the packets to buses 1 and X.

CONCLUSION

Systems and methods consistent with principles of the invention provide a scalable packet processing architecture. With such a construction, the number of connections from the processors to the load balancer and reorder logic, is reduced over conventional parallel processing architectures. The scalable packet processing architecture disclosed herein provides processors connected in a pipeline fashion that behave as if they were connected in parallel—thereby retaining the good properties of both pipeline and parallel processing systems.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, the load balancer (320, 920) has been described as having knowledge of the resource groups (412) within each of the processors (310, 910). This need not be the case, however. In another implementation, the load balancer has no knowledge of the resource groups. In this case, the load balancer load balances packets over the processors, instead of balancing the load over the resource groups. In yet another implementation, the load balancer has knowledge of the resources (410) within each of the processors. In this case, the load balancer load balances packets over the individual resources.

Also, the packet processing systems of FIGS. 3 and 9 have been described as possibly being implemented within a network device. In another implementation consistent with the principles of the invention, each processor (310, 910) may include elements similar to those shown in FIGS. 3 and 9. In other words, each processor (310, 910) may include its own load balancer, set of sub-processors and/or resources, and reorder logic. Alternatively, each processor (310, 910) may not include reorder logic. In this case, there may be a single "system-level" reorder logic.

Further, a feedback mechanism has been described for transmitting packets from reorder logic (330, 930) to load balancer (320, 920). In another implementation consistent with the principles of the invention, a feedback mechanism may alternatively or additionally exist for transmitting packets from processors (310, 910) to load balancer (320, 920).

Certain portions of the invention have been described as "logic" that performs one or more functions. This logic may include hardware, such as an application specific integrated circuit, software, or a combination of hardware and software.

While a series of acts has been described with regard to the flowchart of FIG. 8, the order of the acts may differ in other implementations consistent with the principles of the invention. Further, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A data processing architecture, comprising:
   a plurality of processors connected in series and configured to process data, where the processors include a plurality of processing resources arranged in resource groups;
   a load balancer connected to a first one of the processors and configured to:
      receive data, and
      distribute the data across the processors for processing; and
   reorder logic connected to a last one of the processors and configured to:
      receive the data processed by the processors,
      reorder the data, and
      output the reordered data;
   where the first processor is configured to:
      receive the data from the load balancer,
      determine whether the data is intended for the first processor,
      process the data when the data is intended for the first processor, and
      forward the data to a second one of the processors without processing the data when the data is not intended for the first processor, where the first processor includes a bypass path for bypassing the processing of the data when the data is not intended for the first processor.

2. The data processing architecture of claim 1, where the load balancer balances distribution of the data across the resource groups.

3. The data processing architecture of claim 2, where the processors balance distribution of the data across the resources in the resource groups.

4. The data processing architecture of claim 1, where the processors balance distribution of the data across the resources in the resource groups.

5. The data processing architecture of claim 1, where the load balancer includes:
a classifier configured to receive the data,
a plurality of queues configured to store the data based on a type of the data, and
binding logic configured to identify ones of the resource groups to process the data stored in the queues.

6. The data processing architecture of claim 5, where the binding logic is configured to make a decision regarding the identification of the resource groups to process the data, the decision being made using information regarding a state of the resource groups.

7. The data processing architecture of claim 1, where the reorder logic is further configured to send state information to the load balancer, the state information indicating states of the processors.

8. The data processing architecture of claim 7, where the load balancer is configured to use the state information to balance distribution of the data across the processors.

9. The data processing architecture of claim 1, where the reorder logic is further configured to:
identify data requiring processing by another one of the processors, and
send the identified data to the load balancer.

10. The data processing architecture of claim 1, where each of the processors includes:
a receiver configured to receive the data,
a plurality of resources connected to the receiver and configured to process the data, and
a transmitter connected to the resources and configured to output the processed data.

11. The data processing architecture of claim 10, where the transmitter is further configured to:
determine whether the processed data requires processing by another one of the resources, and
send the processed data to the receiver when the data requires processing by another one of the resources.

12. The data processing architecture of claim 10, where the bypass path connects the receiver directly to the transmitter, where the receiver in the first processor sends the data directly to the transmitter via the bypass path when the data is not intended for the first processor.

13. A data processing architecture, comprising:
a plurality of processors configured to process data;
a load balancer connected to a first one of the processors and configured to:
receive data, and
distribute the data across the processors for processing; and
reorder logic connected to a last one of the processors and configured to:
receive the data processed by the processors
reorder the data, and
output the reordered data;
where the processors are arranged in a plurality of parallel pipelines and connected in series between the load balancer and the reorder logic; and
where the first processor is configured to:
receive the data from the load balancer,
determine whether the data is intended for the first processor,
process the data when the data is intended for the first processor, and
forward the data to a second one of the processors without processing the data when the data is not intended for the first processor, where the first processor includes a bypass path for bypassing the processing of the data when the data is not intended for the first processor.

14. The data processing architecture of claim 13, where the load balancer is configured to balance the distribution of data across the pipelines.

15. The data processing architecture of claim 13, where the load balancer comprises:
a classifier configured to receive the data;
a plurality of queues configured to store the data based on a type of the data; and
binding logic configured to:
identify ones of the processors to process the data stored in the queues based on states of the processors, and
distribute the data to the identified processors.

16. The data processing architecture of claim 15, where the binding logic is configured to balance distribution of the data to the processors based on the states of the processors.

17. The data processing architecture of claim 15, where the binding logic is configured to balance distribution of the data across the pipelines based on the states of the processors in the pipelines.

18. The data processing architecture of claim 15, where the binding logic is configured to transmit the data to the first processor regardless of whether the first processor is one of the identified processors.

19. The data processing architecture of claim 15, where the classifier is further configured to:
receive data previously distributed to one of the identified processors, and
assign the data to one of the queues.

20. A method for processing data by a data processing system that includes a plurality of processors arranged in a plurality of parallel pipelines and connected in series between a load balancer and reorder logic, the method comprising:
receiving data by the load balancer;
assigning by the load balancer, the data to the processors of one or more of the pipelines so as to balance distribution of the data across the pipelines;
sending the data to each of the processors in the one or more of the pipelines in a sequential order determined by the series connection of the processors between the load balancer and the reorder logic;
determining, by each of the processors, whether the data is assigned to be processed by the processor;
processing, by each of the processors, the data by the processor when the data is assigned to be processed by the processor;
forwarding, by each of the processors, the data to another one of the processors in the sequential order without processing the data when the data is not assigned to be processed by the processor;
receiving and reordering, by the reorder logic the processed data to obtain reordered data; and
outputting the reordered data by the reorder logic.

21. The method of claim 20, further comprising:
sending, by the reorder logic, state information to the load balancer, the state information indicating states of the processors.

22. The method of claim 21, where the assigning the data includes:
using the state information to balance distribution of the data across the processors.

23. The method of claim 20, further comprising:
identifying, by the reorder logic, data requiring processing by another one of the processors; and
sending the identified data to the load balancer.

24. A method for processing data by a data processing system that includes a plurality of processors connected between a load balancer and reorder logic, where one of the processors includes a plurality of processing resources arranged in resource groups, the method comprising:
receiving data by the load balancer;
assigning, by the load balancer, the data to the processors so as to balance distribution of the data across the resource groups, where the processors are arranged in a plurality of parallel pipelines each of the pipelines being connected in series between the load balancer and the reorder logic;
sending the data to each of the processors in a sequential order determined by the series connection of the processors;
determining, by each of the processors whether the data is assigned to be processed by the processor;
processing, by each of the processors the data by the processor when the data is assigned to be processed by the processor;
forwarding, by each of the processors, the data to another one of the processors in the sequential order without processing the data when the data is not assigned to be processed by the processor;
receiving and reordering, by the reorder logic, the processed data to obtain reordered data; and
outputting the reordered data.

25. The method of claim 24, further comprising:
balancing, by the one of the processors, distribution of the data across the resources in the resource groups.

26. The method of claim 24, where
the assigning the data further includes:
balancing the distribution of the data across the pipelines.

27. A data processing system, comprising:
means for receiving data;
means for assigning the data to a plurality of processors arranged in a plurality of parallel pipelines and connected in series so as to balance distribution of the data across the pipelines;
means for forwarding the data to each of the processors in one or more of the pipelines irrespective of the assignment of the data to the processors;
means for determining, by each of the processors, whether the data is assigned to the processor;
means for processing, by each of the processors, the data when the data is assigned to the processor;
means for forwarding, by each of the processors, the data to another one of the processors without processing the data when the data is not assigned to the processor; and
means for outputting the processed data.

28. A parallel pipeline system, comprising:
a plurality of pipelines, each of the pipelines including a plurality of processors connected in series and configured to process data;
a load balancer connected to the pipelines and configured to:
receive data, and
distribute the data across the pipelines for processing; and
reorder logic connected to the pipelines and configured to:
receive the data processed by the processors in the pipelines,
reorder the data, and
output the reordered data;
where the processors in the pipelines are connected in series between the load balancer and the reorder logic;
where one of the processors in one of the pipelines is configured to:
receive the data from the load balancer,
determine whether the data is intended for the one processor,
process the data when the data is intended for the one processor, and
forward the data to another one of the processors or the reorder logic without processing the data when the data is not intended for the one processor, where the one processor includes a bypass path for bypassing processing of the data when the data is not intended for the one processor.

29. A parallel pipeline system, comprising:
a plurality of parallel pipelines each of the pipelines including a plurality of processors connected in series and configured to process data, where each of one or more of the processors includes a plurality of processing resources arranged in resource groups;
a load balancer connected to the pipelines and configured to:
receive data, and
distribute the data across the pipelines for processing; and
reorder logic connected to the pipelines and configured to:
receive the data processed by the processors in the pipelines
reorder the data, and
output the reordered data;
where one of the processors in one of the pipelines is configured to:
receive the data from the load balancer,
determine whether the data is intended for the one processor,
process the data when the data is intended for the one processor, and
forward the data to another one of the processors or the reorder logic without processing the data when the data is not intended for the one processor, where the one processor includes a bypass path for bypassing processing of the data when the data is not intended for the one processor.

30. The system of claim 29, where each of the one or more of the processors is configured to balance distribution of the data across the resources.

31. A processor system, comprising:
a plurality of processors configured to process packets, the processors being arranged in a plurality of parallel pipelines;
a load balancer connected to at least a first one of the processors and configured to:
receive packets, and
distribute the packets across the pipelines for processing; and reorder logic connected to at least another one of the processors and configured to:
    receive the packets processed by the processors,
    determine whether one of the packets requires additional processing by another one or more of the processors,
    reorder and output the packets when the packets do not require additional processing by the other one or more of the processors, and
    send one of the packets to the load balancer when the one of the packets requires additional processing by the other one or more of the processors;
where the processors in the pipelines are connected in series between the load balancer and the reorder logic.

32. A processor of a plurality of processors arranged in a plurality of parallel pipelines and connected in series between a load balancer and reorder logic, the load balancer assigning the data to the processor in a manner that balances distribution of the data across the pipelines, the processor comprising:
    a plurality of resources arranged in resource groups;
    a transmitter connected to the resources; and
    a receiver connected to the resources and configured to:
    receive the data,
    determine whether the data is intended for one of the resource groups,
    forward the data to another one of the processors via a bypass path to the transmitter when the data is not intended for one of the resource groups, and
    distribute the data to one of the resources in one of the resource groups when the data is intended for the one of the resource groups.

33. The processor of claim 32, where the receiver is configured to:
    maintain information regarding states of the resources, and
    distribute the data to the resources based on the states of the resources.

34. The processor of claim 32, where the resources are configured to process the data from the receiver; and
    where the transmitter is configured to:
    determine whether the processed data requires processing by another one of the resources, and
    send the processed data to the receiver when the data requires processing by another one of the resources.

* * * * *